(12) United States Patent
Naito (10) Patent No.: US 8,349,683 B2
(45) Date of Patent: Jan. 8, 2013

(54) PRODUCTION METHOD OF A CAPACITOR

(75) Inventor: Kazumi Naito, Chiba (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 10/573,495

(22) PCT Filed: Sep. 24, 2004

(86) PCT No.: PCT/JP2004/014434
§ 371 (c)(1),
(2), (4) Date: Mar. 24, 2006

(87) PCT Pub. No.: WO2005/031772
PCT Pub. Date: Apr. 7, 2005

(65) Prior Publication Data
US 2007/0002526 A1    Jan. 4, 2007

Related U.S. Application Data

(60) Provisional application No. 60/507,942, filed on Oct. 3, 2003.

(30) Foreign Application Priority Data

Sep. 26, 2003   (JP) .................................. 2003-335442

(51) Int. Cl.
*H01L 21/8242*   (2006.01)
*H01L 29/08*     (2006.01)
*H01L 35/24*     (2006.01)
*H01L 51/00*     (2006.01)

(52) U.S. Cl. .................. 438/239; 257/40; 257/E21.008; 257/E27.048

(58) Field of Classification Search .................. 257/307, 257/40, E27.048, E21.008; 361/122, 523; 29/25.03; 438/239
See application file for complete search history.

(56) References Cited

U.S. PATENT DOCUMENTS

| 3,299,325 | A | * | 1/1967 | Wagener et al. | 361/525 |
| 3,950,842 | A | * | 4/1976 | Fournier et al. | 29/25.03 |
| 4,724,053 | A | * | 2/1988 | Jasne | 106/236 |
| 4,943,892 | A | * | 7/1990 | Tsuchiya et al. | 361/525 |
| 4,959,753 | A | * | 9/1990 | Kudoh et al. | 361/525 |
| 5,017,272 | A | * | 5/1991 | Kamigawa | 205/108 |
| 5,071,521 | A | * | 12/1991 | Kojima et al. | 205/153 |
| 5,135,618 | A | * | 8/1992 | Saiki et al. | 205/171 |
| 5,436,796 | A | * | 7/1995 | Abe et al. | 361/525 |
| 5,629,830 | A | * | 5/1997 | Yamagami et al. | 361/535 |
| 6,088,218 | A | * | 7/2000 | Hamada et al. | 361/523 |
| 6,368,363 | B1 | * | 4/2002 | Kobatake et al. | 29/25.03 |

(Continued)

FOREIGN PATENT DOCUMENTS

JP          63-29919         2/1988

(Continued)

*Primary Examiner* — Matthew Landau
*Assistant Examiner* — Latanya N Crawford
(74) *Attorney, Agent, or Firm* — Sughrue Mion, PLLC (57) ABSTRACT

The present invention relates to a method for producing a capacitor comprising, as one electrode, an electric conductor having formed on the surface thereof a dielectric layer and, as the other electrode, a semiconductor layer formed on the electric conductor by energization using the electric conductor as the anode, wherein fine protrusions are formed on the dielectric layer before energization; a capacitor produced by the method thereof having a good capacitance appearance factor and a low ESR; and an electronic circuit and an electronic device using the capacitor.

24 Claims, 6 Drawing Sheets

U.S. PATENT DOCUMENTS

| | | | |
|---|---|---|---|
| 6,409,777 B2 * | 6/2002 | Kobatake et al. | 29/25.03 |
| 6,462,936 B1 * | 10/2002 | Fujimoto et al. | 361/525 |
| 6,464,738 B1 * | 10/2002 | Shimizu et al. | 29/25.03 |
| 6,504,705 B2 * | 1/2003 | Shimada et al. | 361/528 |
| 6,515,847 B1 * | 2/2003 | Naraya | 361/523 |
| 7,202,495 B2 * | 4/2007 | Unno | 257/40 |
| 7,221,554 B2 * | 5/2007 | Brenneman et al. | 361/525 |
| 7,821,772 B2 * | 10/2010 | Kobayashi et al. | 361/525 |
| 2003/0133256 A1 * | 7/2003 | Yoshida et al. | 361/523 |

FOREIGN PATENT DOCUMENTS

| | | |
|---|---|---|
| JP | 63-34917 | 2/1988 |
| JP | 2-66922 A | 3/1990 |
| JP | 03291910 A | 12/1991 |
| JP | 06084708 A | 3/1994 |
| JP | 7-22080 | 3/1995 |
| JP | 09213575 A | 8/1997 |
| JP | 2826341 | 9/1998 |
| JP | 2002-93666 A | 3/2002 |
| JP | 3284993 | 3/2002 |
| JP | 2003213302 A | 7/2003 |
| WO | 02092864 A2 | 11/2002 |

* cited by examiner

A: Feather-like protrusions
B: Island-like protrusions

PRODUCTION METHOD OF A CAPACITOR

CROSS REFERENCE TO THE RELATED APPLICATIONS

This is an application filed pursuant to 35 U.S.C. Section 111(a) with claiming the benefit of U.S. Provisional application Ser. No. 60/507,942 filed Oct. 3, 2003 under the provision of 35 U.S.C. Section 111(b), pursuant to 35 U.S.C. Section 119(e)(1).

TECHNICAL FIELD

The present invention relates to a capacitor having a good capacitance appearance factor and a low ESR.

BACKGROUND ART

A capacitor used in a circuit associated with the central processing unit (CPU) in personal computers and the like is required to have high capacitance and low ESR (equivalent series resistance) in order to prevent the fluctuation of voltage and reduce the generation of heat at the passing of a high ripple current. In general, an aluminum or tantalum solid electrolytic capacitor is used.

The solid electrolytic capacitor is constituted by an aluminum foil having fine pores in the surface layer or a tantalum powder sintered body having fine pores in the inside, which is serving as one electrode (electric conductor), a dielectric layer formed on the surface layer of the electrode, and the other electrode (usually a semiconductor layer) provided on the dielectric layer.

The ratio of the semiconductor layer formed on the dielectric layer is indicated by a impregnation ratio, which is defined as a ratio (percentage) of the capacitance when a semiconductor layer is formed, assuming that the capacitance appearing when an electrolytic solution is impregnated in place of a semiconductor is 100%.

One of the methods for forming a semiconductor layer on the dielectric layer is a method of forming a semiconductor layer by energization. For example, a method of forming a semiconductor layer comprising a metal oxide by passing a direct current (Japanese Patent No. 1,985,056), a method of obtaining a semiconductor layer comprising an electrically conducting compound by passing an alternating current (Japanese Patent No. 2,826,341), a method of obtaining a semiconductor layer comprising an electrically conducting compound on a previously-formed chemical polymerization layer by passing a direct current (Japanese Patent No. 3,284,993), or a method of obtaining a semiconductor layer comprising an electrically conducting polymer by contacting a separately prepared external electrode on a previously-provided chemical polymerization layer and by passing a direct current (Japanese Patent No. 1,988,457).

DISCLOSURE OF THE INVENTION

According to the methods of Japanese Patent Nos. 1,985,056 and 2,826,341, good ESR may be obtained, but a long time is necessary to form a semiconductor layer and the impregnation ratio cannot be increased within a normal time.

The method of Japanese Patent No. 2,826,341 is disadvantageous in that counter electrodes are necessary for simultaneously forming semiconductor layers on multiple electric conductors in an industrial scale and the semiconductor layer attaches also to the counter electrodes.

Also, the methods of Japanese Patent Nos. 3,284,993 and 1,988,457 are disadvantageous in that when these methods are applied to the case of simultaneously forming semiconductor layers on multiple electric conductors, the semiconductor layer cannot be successfully formed by energization on some electric conductors assumably due to disturbance by the chemical polymerization layer and in that when the semiconductor is successfully formed, despite a high impregnation ratio, a good ESR value is not obtained because a chemical polymerization layer is formed.

Accordingly, a method for producing a capacitor improved in ESR and increased in capacitance is demanded.

As a result of intensive investigations to solve those problems, the present inventors have found that such problems can be overcome by forming peculiar fine protrusions on the dielectric layer without forming a chemical polymerization layer. The present invention has been accomplished based on this finding.

That is, the present invention relates to the following production method of a capacitor and also to a capacitor produced by the production method.

1. A method for producing a capacitor comprising, as one electrode, an electric conductor having formed on the surface thereof a dielectric layer and, as the other part electrode, a semiconductor layer formed on the electric conductor by energization using the electric conductor as the anode, wherein fine protrusions are formed on the dielectric layer before energization.

2. The method for producing a capacitor as described in 1 above, wherein the fine protrusion is in an island-like shape and/or in a feather-like shape.

3. The method for producing a capacitor as described in 1 or 2 above, wherein the fine protrusion has a width of 0.1 to 60 nm.

4. The method for producing a capacitor as described in any one of 1 to 3 above, wherein the majority of the fine protrusions are present on the outer surface of the electric conductor and on the inner pore surface within 10 µm from the outer surface.

5. The method for producing a capacitor as described in any one of 1 to 4 above, wherein the fine protrusion is at least one member selected from a metal oxide, a metal salt, a transition element-containing inorganic compound, a transition element-containing organic compound and a polymer compound.

6. The method for producing a capacitor as described in 1 above, wherein the electric conductor is at least one member selected from a metal, an inorganic semiconductor, an organic semiconductor and carbon or a mixture thereof.

7. The method for producing a capacitor as described in 1 or 6 above, wherein the electric conductor is a laminated body having, as the surface layer, at least one member selected from a metal, an inorganic semiconductor, an organic semiconductor and carbon, or a mixture thereof.

8. The method for producing a capacitor as described in 1 above, wherein the dielectric layer is one member selected from a metal oxide.

9. The method for producing a capacitor as described in 8 above, wherein the dielectric layer mainly comprises at least one member selected from metal oxides such as $Ta_2O_5$, $Al_2O_3$, $TiO_2$ and $Nb_2O_5$.

10. The method for producing a capacitor as described in 1 above, wherein the semiconductor layer is at least one member selected from an organic semiconductor layer and an inorganic semiconductor layer.

11. The method for producing a capacitor as described in 10 above, wherein the organic semiconductor is at least one member selected from an organic semiconductor comprising benzopyrroline tetramer and chloranil, an organic semiconductor mainly comprising tetrathiotetracene, an organic semiconductor mainly comprising tetracyano-quinodimethane, and an organic semiconductor mainly comprising an electrically conducting polymer obtained by doping a dopant into a polymer containing a repeating unit represented by the following formula (1) or (2):

wherein $R^1$ to $R^4$ each independently represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom, and represents a hydrogen atom or an alkyl group having from 1 to 6 carbon atoms, and each of the pairs of $R^1$ and $R^2$, and $R^3$ and $R^4$ may combine with each other to form a cyclic structure.

12. The method for producing a capacitor as described in 11 above, wherein the electrically conducting polymer containing a repeating unit represented by formula (1) is an electrically conducting polymer containing a structure unit represented by the following formula (3) as a repeating unit:

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen atoms when the alkyl groups are combined with each other at an arbitrary position, and the cyclic structure includes a structure having a vinylene bond which may be substituted, and a phenylene structure which may be substituted.

13. The method for producing a capacitor as described in 11 above, wherein the electrically conducting polymer is selected from polyaniline, polyoxyphenylene, polyphenylene sulfide, polythiophene, polyfuran, polypyrrole, polymethylpyrrole, and substitution derivatives and copolymers thereof.

14. The method for producing a capacitor as described in 12 or 13 above, wherein the electrically conducting polymer is poly(3,4-ethylenedioxythiophene).

15. The method for producing a capacitor as described in 10 above, wherein the inorganic semiconductor is at least one compound selected from molybdenum dioxide, tungsten dioxide, lead dioxide and manganese dioxide.

16. The method for producing a capacitor as described in 10 above, wherein the electrical conductivity of the semiconductor is from $10^{-2}$ to $10^3$ S/cm.

17. A capacitor produced by the production method described in any one of 1 to 16 above.

18. The capacitor as described in 17 above, wherein the impregnation ratio of the semiconductor is 85% or more.

19. An electronic circuit using the capacitor described in 17 or 18 above.

20. An electronic device using the capacitor described in 17 or 18 above.

Embodiments of the production method of a capacitor and the capacitor of the present invention are described below.

Examples of the electric conductor for use in the present invention include at least one member selected from a metal, an inorganic semiconductor, an organic semiconductor and carbon, a mixture thereof, or a laminated body obtained by stacking such an electric conductor as the surface layer.

Examples of the inorganic semiconductor include metal oxides such as lead dioxide, molybdenum dioxide, tungsten dioxide, niobium monoxide, tin dioxide and zirconium monoxide. Examples of the organic semiconductor include electrically conducting polymers such as polypyrrole, polythiophene, polyaniline and substitution product or copolymer having such a polymer skeleton, and low molecular complexes such as complex of tetracyanoquinodimethane and tetrathiotetracene, and tetracyanoquinodimethane (TCNQ) salt. Examples of the laminated body obtained by stacking an electric conductor as the surface layer include laminated bodies where the above-described electric conductor is laminated on paper, insulating polymer, glass or the like.

In the case of using a metal as the electric conductor, for the purpose of improving the capacitor properties, for example, for reducing the LC value, the metal may be used after subjecting a part thereof to at least one treatment selected from carbidation, phosphation, boronation, nitridation and sulfidation.

The electric conductor is not particularly limited in its shape and may have a foil-, plate- or bar-like shape or an electric conductor in a powder form may be used after shaping it or shaping and then sintering it. Also, the electric conductor may be subjected to a surface treatment such as etching to have fine pores. In particular, a powder electric conductor in the form of a sintered body and an electric conductor surface-treated to have fine pores and thereby increased in the surface area are preferred because the capacitance per unit volume of the capacitor is increased. In the case of shaping or shaping and then sintering a powder electric conductor, fine pores can be provided inside the shaped or sintered electric conductor by appropriately selecting the pressure at the shaping.

According to the method of the present invention where fine protrusions are formed on the dielectric layer before energization for forming a semiconductor layer, the impregnation ratio of semiconductor can be increased.

The method of the present invention is effective particularly when applied to an electric conductor on which a semiconductor of a high impregnation ratio is difficult to obtain. For example, as for the electric conductor having a sintered body shape, the method of the present invention is effective when applied to an electric conductor having a size of 5 mm$^3$ or more and having a CV value (product of capacitance and electrochemical voltage when measured with an electrolytic solution) of 100,000 μF·V/g or more in the case of a sintered body of a tantalum metal powder material or having a CV value of 170,000 μF·V/g or more in the case of a sintered body of a niobium metal powder material. As for the electric conductor having an etched foil shape, the method of the present invention is effective when applied to an electric conductor having a CV value of 1,000 μF·V/cm$^2$ or more where pores having a depth of 200 μm or more are produced by etching.

It is possible to directly connect an outgoing lead wire to the electric conductor. In the case of shaping or shaping and then sintering a powder electric conductor, a part of a separately prepared outgoing lead (lead wire or lead foil) may be shaped together with the electric conductor and the outgoing lead outside the shaped portion may be used as the outgoing lead of one electrode of the capacitor.

Examples of the dielectric layer formed on the surface of the electric conductor of the present invention include a dielectric layer mainly comprising at least one member selected from metal oxides such as $Ta_2O_5$, $Al_2O_3$, $TiO_2$ and $Nb_2O_5$, or a dielectric layer conventionally known in the field of ceramic capacitors or film capacitors. In the case of the former dielectric layer mainly comprising at least one member selected from metal oxides, when the dielectric layer is formed by electrochemically forming the electric conductor having a metal element of the metal oxide in an electrolytic solution containing a mineral acid or an organic acid, the obtained capacitor becomes an electrolytic capacitor having a polarity. Examples of the dielectric layer conventionally known in the field of ceramic or film capacitors include dielectric layers described in JP-A-63-29919 (the term "JP-A" as used herein means an "unexamined published Japanese patent application") and JP-A-63-34917. The dielectric layer mainly comprising at least one member selected from metal oxides or the dielectric layer conventionally known in the field of ceramic or film capacitors may be used by laminating a plurality of these layers. Also, the dielectric layer may be a mixture of the dielectric layer mainly comprising at least one member selected from metal oxides and the dielectric layer conventionally known in the field of ceramic or film capacitors.

In the present invention, formation of fine protrusions on the dielectric layer is important as a pretreatment for increasing the degree of forming a semiconductor layer.

The materials used for forming fine protrusions on the dielectric layer include at least one material selected from inorganic or organic materials. Examples of the inorganic material include a conventionally known metal oxide, metal salt and transition element-containing inorganic compound. Examples of the organic material include a salt of organic acid or organic base, a transition element-containing organic compound, and a polymer compound. The inorganic or organic material may be an insulator, a semiconductor or a conductor, but in order to produce a capacitor having a low ESR value, a semiconductor or conductor having an electrical conductivity of $10^{-2}$ to $10^3$ S/cm is preferred. If the material for forming fine protrusions covers the entire surface of the dielectric layer and forms a layer, the ESR value of the capacitor produced becomes high and this is not preferred. A plurality of fine protrusions can be formed on the dielectric material by contacting the inorganic or organic material with the electric conductor having on the surface thereof a dielectric layer. In the case where the inorganic or organic material is solid, a solution obtained by dissolving this material in an appropriate solvent is contacted with the electric conductor and thereafter the solvent is evaporated and dried out, whereby fine protrusions can be formed. Instead of a solution, a sol having dispersed therein the fine protrusion material may be used. Also, fine protrusions may be produced by reacting a precursor of the organic or inorganic material on the electric conductor.

The shape of the fine protrusion formed on the dielectric layer is diversified, but a grain-like shape, an island-like shape, a feather-like shape and a mixture of these shapes are preferred because a capacitor having a low ESR value and a good impregnation ratio can be produced. The size of the fine protrusion varies depending on its shape, but in the case of a grain-like or island-like fine protrusion, the width and height are from about 0.1 to about 120 nm, preferably from about 0.5 to about 60 nm, more preferably from about 1 to about 30 nm, and in the case of a feather-like fine protrusion, the width is nearly the same as that of the grain-like or island-like fine protrusion and the height (length) is from about 0.1 to about 600 nm, preferably from about 1 to about 120 nm.

Figure 4:
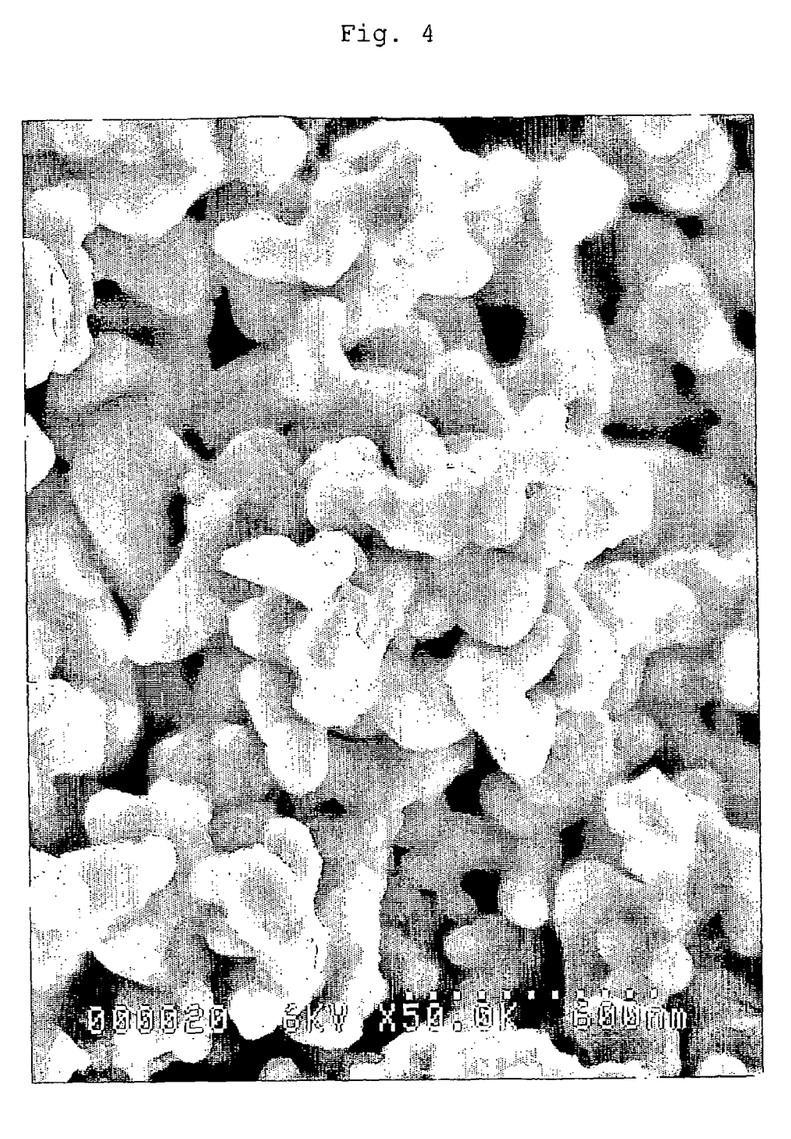
FIG. 4 is an SEM photograph (at a magnification of 50,000) of the sintered body section 3 μm below the surface where fine protrusions are formed according to the present invention (Example 2).
Figure 5:
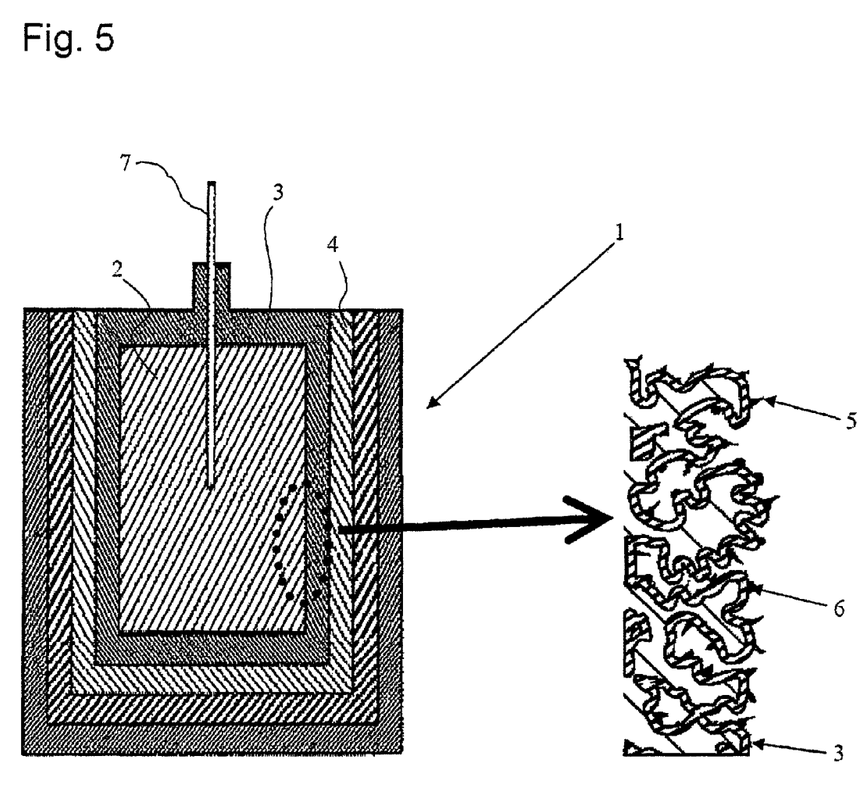
FIG. 5 is a cross-sectional view of a capacitor 1 produced in accordance with the method of the invention, including, as one electrode, an electric conductor 2 having formed on the surface thereof a dielectric layer 3 and, as the other part electrode, a semiconductor layer 4 formed on the electric conductor. Further, lead wire 7 is embedded in electric conductor 2. As shown in the enlarged view, feather-shaped fine protrusions 5 and other fine protrusions 6 are formed on the dielectric layer 3.
Figure 6:
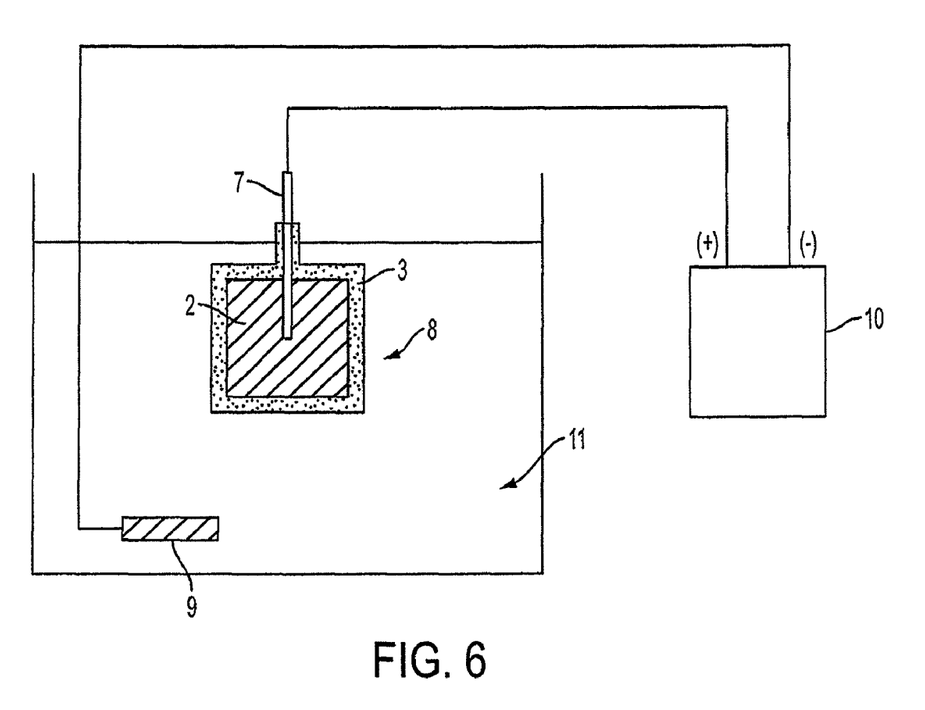
FIG. 6 illustrates the energization of the embodiment of Example 1 for forming a semiconductor layer on sintered body 8, the sintered body 8 including lead wire 7 embedded in electric conductor 2 having formed on the surface thereof dielectric layer 3 and further including fine protrusions (not shown) formed on the dielectric layer 3. The sintered body 8 is dipped into electrolytic solution (semiconductor layer-forming solution) 11, and a positive terminal of direct current source 10 is electrically connected to the lead wire 7 and a negative terminal of the direct current source is electrically connected to a negative electrode plate 9 disposed in the electrolytic solution, to thereby pass a direct current between the lead wire 7 and the negative electrode plate 9.

In the case where the electric conductor is a shaped article or a sintered body or in the shape having etched pores, the portion in which the majority (50% or more, preferably 80% or more) of fine protrusions are present is preferably the outer surface (outer surface not containing an inner pore perceivable with an eye through a scanning electron microscope (SEM)) and the interior within 10 μm from the outer surface (this portion can be confirmed by SEM observation of the ruptured electric conductor; FIG. 4 is an SEM photograph at a magnification of 50,000 showing the portion within 3 μm from the original surface of the broken-out section of a sintered body formed in Example 2 which is described later).

As for the ratio of fine protrusions formed, as an average of 10 observation points each in about 300 nm$^2$ when observing an SEM photograph at a magnification of 100,000, fine protrusions having a short width of 1 to 10 nm are preferably present at a ratio of 1 to 1,000 protrusions, more preferably from 3 to 100 protrusions, per a plane of 300 nm$^2$.

Figure 1:
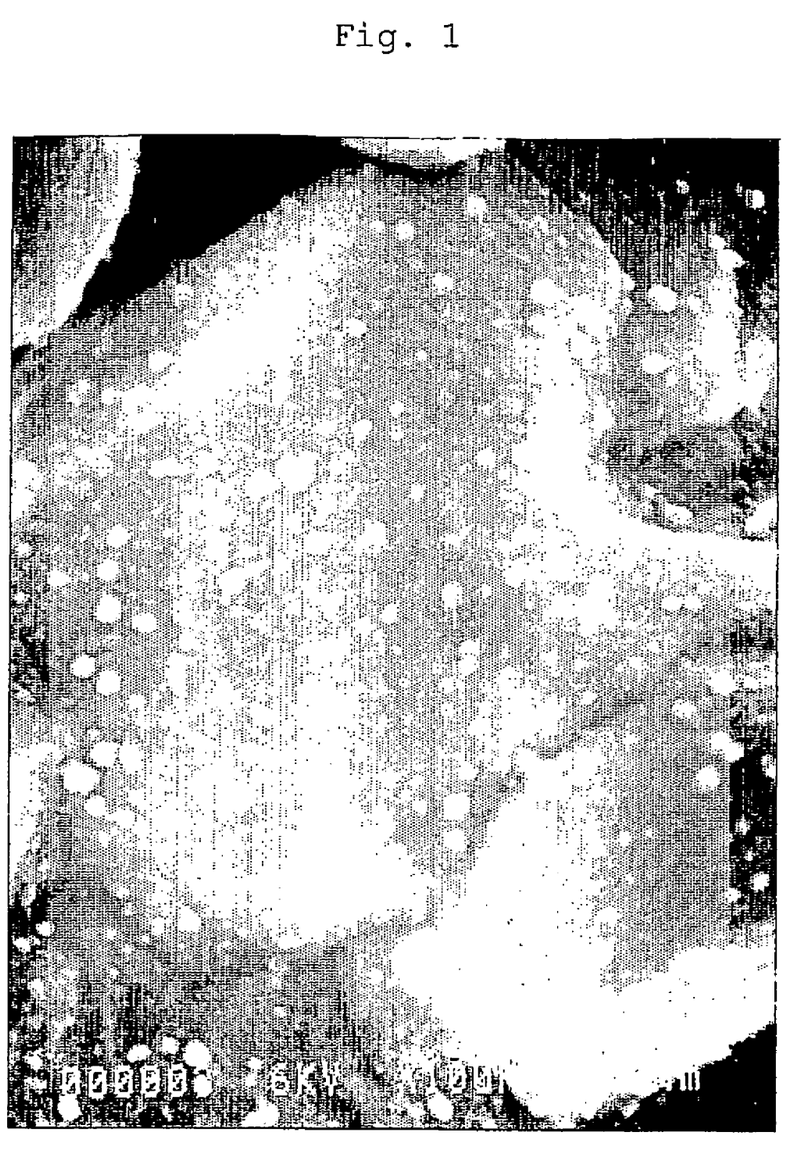
FIG. 1 is an SEM photograph (at a magnification of 100,000) showing fine protrusions in an example (Example 3) of the present invention.
Figure 2:
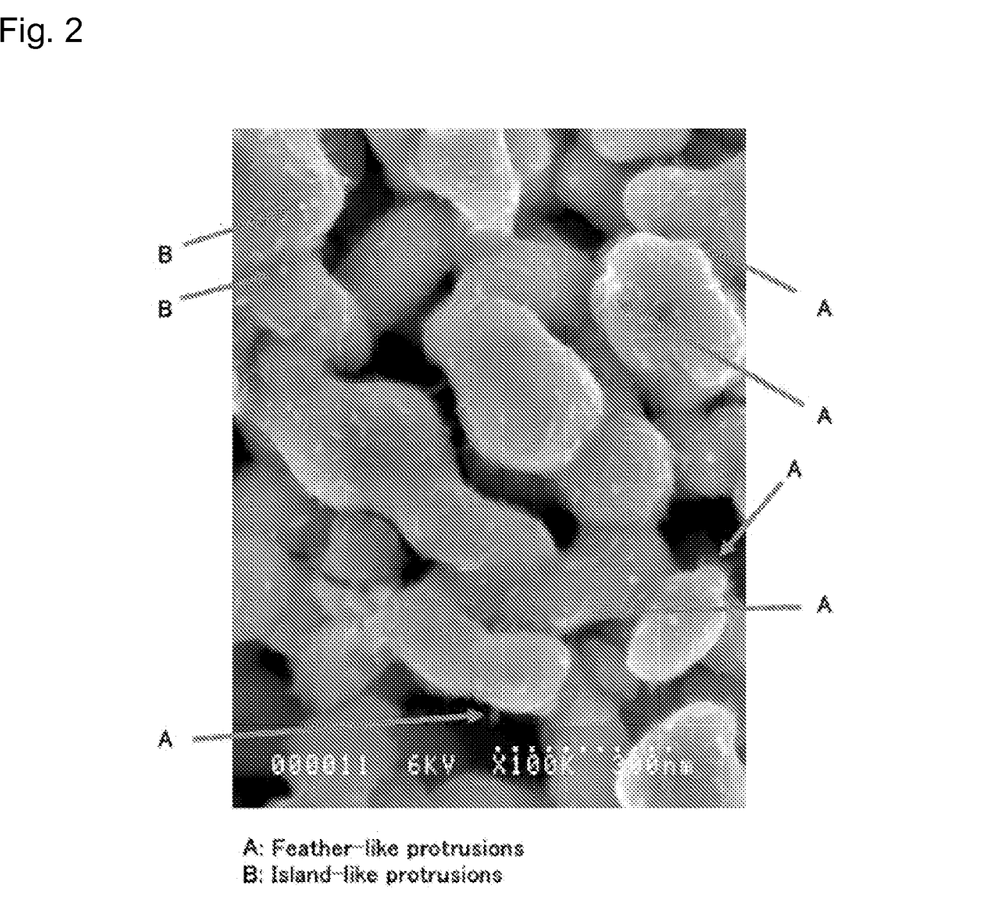
FIG. 2 is an SEM photograph (at a magnification of 100,000) showing fine protrusions in another example (Example 2) of the present invention.
Figure 3:
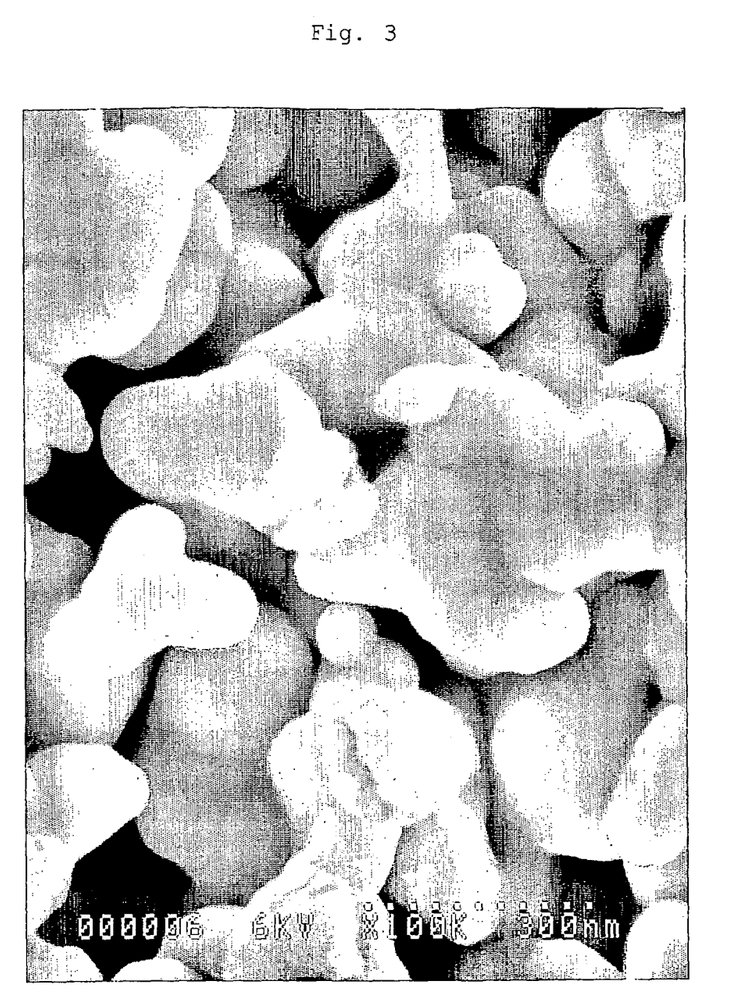
FIG. 3 is an SEM photograph (at a magnification of 100,000) showing the surface where protrusions are not formed.

FIG. 1 (Example 3) and FIG. 2 (Example 2) each is an SEM photograph (at a magnification of 100,000) showing one example of the fine protrusions of the present invention (fine protrusions produced in Examples and Comparative Examples described later). Also, FIG. 3 (Comparative Example 2) is an SEM photograph (at a magnification of 100,000) showing the surface where protrusions are not formed. In both of FIGS. 1 and 2, a dielectric layer is formed on the surface of an electric conductor in a sintered body shape, where one can observe island-like fine protrusions in FIG. 1 and feather-like or island-like protrusions in FIG. 2.

In the present invention, as described above, a semiconductor layer is formed on the dielectric layer of the electric conductor by energization using the electric conductor having fine protrusions as the anode. At this time, the current readily flows assumably because the dielectric layer in the portion where fine protrusions are formed is unstable, and a semiconductor layer is successfully formed within a relatively short time. As a result, the capacitor produced can have a good ESR value and a capacitor having a high impregnation ratio and a good capacitance appearance factor can be obtained.

Incidentally, the protrusion is fine and therefore, the electric resistance less increases due to the presence of the fine protrusions. Also, since the protrusion is fine, impregnation of a semiconductor is not inhibited.

As for the semiconductor formed by energization on the dielectric layer of the electric conductor having fine protrusions of the present invention, at least one compound selected from an organic semiconductor and an inorganic semiconductor is used.

Specific examples of the organic semiconductor include an organic semiconductor mainly comprising an electrically conducting polymer obtained by doping a dopant to a polymer containing a repeating unit represented by the following formula (1) or (2):

wherein $R^1$ to $R^4$ each independently represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom, and represents a hydrogen atom or an alkyl group having from 1 to 6 carbon atoms, and each of the pairs of $R^1$ and $R^2$, and $R^3$ and $R^4$ may combine with each other to form a ring.

The electrically conducting polymer containing a repeating unit represented by formula (1) for use in the present invention is preferably an electrically conducting polymer containing a structure unit represented by the following formula (3) as a repeating unit:

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen atoms when the alkyl groups are combined with each other at an arbitrary position. The cyclic structure includes a structure having a vinylene bond which may be substituted, and a phenylene structure which may be substituted.

The electrically conducting polymer containing such a chemical structure is electrically charged and a dopant is doped therein. The dopant is not particularly limited and a known dopant can be used.

Examples of the polymer containing a repeating unit represented by formulae (1) to (3) include polyaniline, polyoxyphenylene, polyphenylene sulfide, polythiophene, polyfuran, polypyrrole, polymethylpyrrole, and substitution derivatives and copolymers thereof. Among these, preferred are polypyrrole, polythiophene and substitution derivatives thereof (e.g., poly(3,4-ethylenedioxythiophene)).

Specific examples of the inorganic semiconductor include at least one compound selected from molybdenum dioxide, tungsten dioxide, lead dioxide and manganese dioxide, etc.

When the organic or inorganic semiconductor used has an electrical conductivity of $10^{-2}$ to $10^3$ S/cm, the capacitor produced can have a small ESR value and this is preferred.

One example of the method for forming this semiconductor layer on the electric conductor is described below. The electric conductor in which fine protrusions are formed is dipped in a separately prepared semiconductor layer-forming solution and by using the electric conductor as the anode, a current is passed to a cathode disposed in the semiconductor layer-forming solution, whereby the semiconductor layer is formed. The energization method includes a constant voltage method, a constant current method and a combination thereof, but in the case of forming semiconductor layers by simultaneously passing a current to multiple electric conductors, a constant current method is preferred because the semiconductor layer can be stably formed.

The energization time and predetermined current value vary depending on, for example, the kind, size and density of the electric conductor used, the kind and thickness of the dielectric layer formed, or the kind of the semiconductor layer formed and therefore, these are determined by performing a preliminary experiment. As one technique for the preliminary experiment, the advisability of the predetermined constant current value can be judged by controlling the mass of the semiconductor layer. Examples thereof include a method of previously plotting the mass of semiconductor against energization time with respect to respective constant current values and selecting the constant current value when the plot reaches a saturated value and the mass of the semiconductor becomes maximum.

When a constant current method is used, the initial voltage value at the energization is a value determined by the predetermined constant current value. In the case of forming a dielectric layer by the above-described electrochemical formation, the initial voltage value sometimes exceeds the electrochemical formation voltage.

A current is passed to the semiconductor layer-forming solution in which raw materials working out to the semiconductor after energization and, if desired, the above-described dopant (for example, a known dopant such as arylsulfonic acid or its salt, alkylsulfonic acid or its salt, various polymer sulfonic acids or salts thereof, and a compound having the above-described substituents) are dissolved, whereby the semiconductor layer is formed on the dielectric layer. As for the temperature and pH of the semiconductor layer-forming solution, conditions for facilitating the formation of semiconductor layer are decided by performing a preliminary experiment. A cathode plate disposed in the semiconductor layer-forming solution is used as the counter cathode at the energization and an electrically conducting material, particularly, a metal foil or plate is used therefor. In the case of simultaneously forming semiconductor layers on multiple electric conductors, it is preferred to locate multiple cathode plates electrically connected to at least one power supply part and dispose these cathode plates so that the electric power can be uniformly distributed using the cathode plates to all of multiple electric conductors dipped in the semiconductor layer-forming solution.

In the present invention, in order to repair fine defects of the dielectric layer generated resulting from formation of the semiconductor layer, re-electrochemical formation (when the dielectric layer is not formed by electrochemical formation, first electrochemical formation) may be performed after energization. Also, the energization and re-electrochemical formation may be repeated multiple times and the energization conditions may be changed among repeated energization treatments. When the energization is stopped, the electric conductor is usually pulled out from the semiconductor layer-forming solution and washed and dried, but after the steps of energization—stop of energization—washing—drying are performed multiple times, the re-electrochemical formation step may be started. Although the reasons are not clearly known, the mass of semiconductor sometimes increases when energization—stop of energization—washing—drying are repeated, compared to the case of continuously performing the energization with the same energization time.

The re-electrochemical formation can be performed in the same manner as in the method described above for forming the dielectric layer by electrochemical formation. The re-electrochemical formation is performed at a voltage of the electrochemical formation voltage or lower.

In the present invention, an electrode layer is provided on the semiconductor layer formed by the above-described method or the like. The electrode layer can be formed, for example, by solidification of an electrically conducting paste, plating, vapor deposition of a metal, or adhesion of a heat-resistant electrically conducting resin film. Preferred examples of the electrically conducting paste include silver paste, copper paste, aluminum paste, carbon paste and nickel paste, and these may be used individually or in combination of two or more thereof. In the case of using two or more pastes, the pastes may be mixed or may be superposed one on another as separate layers. The electrically conducting paste applied is then solidified by allowing it to stand in air or under heating.

The electrically conducting paste mainly comprises resin and electrically conducting powder such as metal. Depending on the case, a solvent for dissolving the resin, a curing agent for the resin, etc. are added. The solvent dissipates at the solidification.

Examples of the resin for use in the electrically conducting paste include various known resins such as alkyd resin, acryl resin, epoxy resin, phenol resin, imide resin, fluororesin, ester resin, imidamide resin, amide resin, styrene resin and urethane resin.

As for the electrically conducting powder, at least one member selected from powder of silver, copper, aluminum, gold, carbon, nickel or alloy mainly comprising such a metal, coated powder having a surface layer composed of such a metal, and mixture powder thereof is used.

The electrically conducting powder is usually contained in an amount of 40 to 97 mass %. If the content is less than 40 mass %, the electrical conductivity of the electrically conducting paste produced is small, whereas if it exceeds 97 mass %, the electrically conducting paste may disadvantageously cause adhesion failure. The electrically conducting paste may be used by mixing therewith powder of the above-described electrically conducting polymer or metal oxide for forming the semiconductor layer.

Examples of the plating include nickel plating, copper plating, silver plating, gold plating and aluminum plating. Examples of the metal vapor-deposited include aluminum, nickel, copper, gold and silver.

Specifically, for example, an electrically conducting layer is formed by sequentially stacking a carbon paste and a silver paste on the anode substrate where the semiconductor layer is formed.

In this way, a capacitor element where layers up to the electrode layer are stacked to form the cathode layer is produced.

The capacitor element of the present invention having such a constitution is jacketed, for example, by resin mold, a resin case, a metallic jacket case, resin dipping or a laminate film and thereby can be completed as a capacitor product for various uses. Among these, a chip capacitor jacketed by resin mold is preferred, because reduction in the size and in the cost can be simply attained.

As for the kind of the resin used in the resin mold jacketing, known resins for use in the molding of a solid electrolytic capacitor such as epoxy resin, phenol resin and alkyd resin can be employed, however, in each kind of resin used, low-stress resin generally available on the market is preferable because the molding stress of the resin on the capacitor element, which is generated at the molding, can be mitigated. The production machine for performing the molding with resin is preferably a transfer machine.

The thus-produced capacitor may be subjected to an aging treatment so as to repair the thermal and/or physical deterioration of the dielectric layer, which is caused at the formation of electrically conducting layer or at the jacketing. The aging is performed by applying a predetermined voltage (usually, within 2 times the rated voltage) to the capacitor. The optimal values of aging time and temperature vary depending on the kind and capacitance of a capacitor and the rated voltage and therefore, these values are determined by previously performing an experiment, but the aging time is usually from several minutes to several days and the aging temperature is usually 300° C. or less by taking account of heat deterioration of the voltage-applying jig. The aging may be performed in the air or in a gas atmosphere such as Ar, $N_2$ or He and may be performed under reduced pressure, atmospheric pressure or applied pressure, but when the aging is performed while or after supplying water vapor, the stabilization of the dielectric layer sometimes proceeds. Examples of the method for supplying water vapor include a method of supplying water vapor from a water reservoir placed in the aging furnace by using the heat.

As for the method of applying a voltage, an arbitrary current such as direct current, alternating current having an arbitrary waveform, alternating current superposed on direct current, and pulse current can be designed to pass. Aging may be adopted, wherein an applied voltage gradually changes from a low voltage to a high voltage. It is also possible to once stop the application of voltage during aging and again apply a voltage.

The capacitor produced by the method of the present invention can be preferably used for circuits requiring a high-capacitance and low ESR capacitor, such as a central processing circuit and a power source circuit. These circuits can be used in various digital devices such as a personal computer, server, camera, game machine, DVD equipment, AV equipment and cellular phone, and electronic devices such as various power sources. The capacitor produced by the method of the present invention has high capacitance and good ESR performance and therefore, by using this capacitor, electronic circuits and electronic devices having good performances can be obtained.

BEST MODE FOR CARRYING OUT THE INVENTION

The present invention is described in greater detail below by referring to Examples, but the present invention is not limited to these Examples.

Example 1

By using and shaping a tantalum powder having CV (product of capacitance and electrochemical voltage) of 150,000 μF·V/g together with a Ta lead wire of 0.24 mmφ, a sintered bodies in a size of 4.5×1.0×1.5 mm were produced (sintering temperature: 1,300° C., sintering time: 20 minutes, density of sintered body: 6.2 g/cm$^3$; the Ta lead wire was vertically embedded in the center part of the 1.0×1.5 mm face of the sintered body while being buried 4 mm inside the sintered body and protruding 10 mm outside). On a separately prepared polyimide-made resin plate having a length of 250 mm, a width of 30 mm and a thickness of 2 mm (There are provided by printed wiring, on the front surface of the plate, a circuit connecting connection terminals for 32 electric conductors and respective anodes of current regulated diodes and reaching the power supply terminal in the left side of plate, and on the back surface, a circuit electrically connected only to the connection terminals for electric conductors on the front surface and reaching the power supply terminal for electrochemical formation in the right side of the plate through rectifier diodes), lead wires of the 32 sintered bodies produced above were aligned and connected at equal intervals and in equal dimensions while leaving blank a portion of 30 mm on left and right sides. After preparing 20 sheets of such a resin plate, the plates were arrayed in parallel at intervals of 5 mm and disposed on a metal-made frame to take the electrical connection at 15 mm on left and right sides of the resin plate (the center parts of left and right sides of the frame are electrically insulated from each other and the left and right power supply terminals, the former being provided on the front and the latter on the back of the resin plate, are insulated). In this way, 640 sintered bodies were disposed at equal intervals on the metal-made frame and each sintered body was electrically connected to the left and right power supply terminals provided on the metal-made frame through the lead wire. By taking a string of the sintered bodies on the metal-made frame as one lot, various operations were performed as follows.

The sintered bodies excluding a part of the lead wire were dipped in an aqueous 1% phosphoric acid solution and electrochemically formed at 80° C. for 10 hours while applying a voltage of 10 V between the lead wire as the anode and a Ta cathode plate disposed in the aqueous solution by utilizing the power supply terminal on the back surface right side of the metal-made frame to form an oxide dielectric film layer comprising Ta$_2$O$_5$. The resulting sintered bodies excluding respective lead wires were dipped in a fine protrusion-forming solution (prepared by dissolving 30 g of ammonium molybdate and 200 g of nickel sulfate hexahydrate in 800 g of water and adding thereto 250 ml of 1N ammonium hydroxide) and electrolytically reacted at room temperature for 150 minutes while applying 2.2 V between the lead wire as the anode and a Ta plate as the cathode provided in the fine protrusion-forming solution by utilizing the power supply terminal on the front surface left side of the metal-made frame to form fine precipitates mainly comprising molybdenum oxide on the oxide dielectric film layer. When observed through SEM, the majority of particulate protrusions in a width of 10 nm to 30 nm were present on the surface of the sintered body and in the region within 100 μm from the surface layer. Thereafter, the sintered bodies were pulled up from the solution, washed with water, dried and then subjected to re-electrochemical formation at 8 V and 80° C. for 30 minutes in an aqueous 0.1% phosphoric acid solution by utilizing the power supply terminal on the back surface right side of the metal-made frame. Thereafter, the sintered bodies were washed with water and dried.

The resulting sintered bodies excluding respective lead wires were dipped in an electrolytic solution (semiconductor layer-forming solution) comprising 20% ethylene glycol and water, where ethylenedioxythiophene (used as an aqueous solution in which the monomer was in a saturated concentration or lower) and anthraquinonesulfonic acid were dissolved, and a direct constant current of 20 mA was passed for 30 minutes at room temperature between the lead wire and a negative tantalum electrode plate disposed in the electrolytic solution by utilizing the power supply terminal on the front surface left side of the metal-made frame, thereby performing energization for forming the semiconductor layer. The sintered bodies were pulled up, washed with water to remove unpolymerized materials, then washed with ethanol, dried and subjected to re-electrochemical formation (80° C., 30 minutes, 6 V) for repairing LC (leakage current)-causing fine defects of the dielectric layer in an aqueous 1% phosphoric acid solution by utilizing the power supply terminal on the back surface right side of the metal-made frame. These energization and re-electrochemical formation were repeated 12 times (last two energization treatments were performed for 60 minutes). Subsequently, the sintered bodies were washed with water and then with ethanol and dried to form semiconductor layers. Thereafter, a carbon paste and a silver paste were attached in this order on the semiconductor layer excluding the surface on which the lead wire was embedded, and dried to provide a cathode layer and thereby complete the cathode part. In this way, solid electrolytic capacitor elements were produced.

On upper surfaces of a pair of end parts of a separately prepared 100 μm-thick copper alloy lead frame having a tin-plated surface (32 paired end parts each in a width of 3.4 mm were present and when coplanarly projected, a gap of 1.0 mm was present between both end parts), cathode part faces (the face of 4.5 mm×1.5 mm) and anode lead wires (partially cut and removed) of the two solid electrolytic capacitor elements produced above were gaplessly laid by aligning respective directions and then electrically and mechanically connected by solidification of the same silver paste as the one used in the cathode part for the former and by spot-welding for the latter. Subsequently, the device was molded with epoxy resin by transfer molding while leaving outside a part of the lead frame, and the lead frame outside the resin was cut at a predetermined position and then bent along the jacket part. Thereafter, the jacket resin was cured at 185° C. and then the device was subjected to aging at 105° C. and 4 V for 4 hours to produce 320 chip solid electrolytic capacitors in a size of 7.3×4.3×1.8 mm.

Comparative Example 1

206 chip solid electrolytic capacitors (produced from 412 capacitor elements where the semiconductor layer was relatively successfully formed) were produced in the same manner as in Example 1 except that a sintered body was obtained by forming a dielectric layer without forming fine protrusions. The obtained sintered body was dipped in the semiconductor layer-forming solution and the semiconductor layer was formed by repeating eight times the step of energization at 2 mA for 30 hours and the same re-electrochemical formation as in Example 1.

Example 2

An oxide dielectric film layer comprising $Nb_2O_5$ was formed through electrochemical formation at 23 V by using a niobium sintered body (made of powder having CV of 270,000 µF·V/g, nitrided amount: 10,000 ppm, amount of oxygen due to natural oxidation on the surface: 84,000 ppm, sintering temperature: 1,280° C., sintering time: 30 minutes, density of the sintered body: 3.4 g/cm$^3$) and a niobium lead wire in place of the tantalum sintered body and the tantalum lead wire in Example 1. Then, a series of operations, that is, the sintered bodies were dipped in an alcohol solution of 2% ethylenedioxythiophene, pulled up, left standing, dipped in an alcohol solution of 18% iron naphthalenesulfonate, pulled up, left standing at 40° C. for 30 minutes and dipped in alcohol, were repeated seven times, whereby fine protrusions mainly comprising ethylenedioxy polymer were produced on the dielectric layer. When observed through SEM, the fine protrusions had an island- or string-like shape with a width of 0.1 to 20 nm and the majority of the fine protrusions were present on the surface of the sintered body and in the region within 3 µm from the surface layer. The sintered bodies were then subjected to re-electrochemical formation at 17 V and 80° C. for 30 minutes in an aqueous 0.1% acetic acid solution, washed with water, then washed with ethanol and dried. Thereafter, the energization and re-electrochemical formation (14 V) were repeated in the same manner as in Example 1 to form a semiconductor layer and furthermore, the formation of a cathode layer and the aging (85° C., 6 V, 4 hours) were performed. In this way, 320 chip solid electrolytic capacitors were produced.

Comparative Example 2

187 chip solid electrolytic capacitors (produced from 374 capacitor elements where the semiconductor layer was relatively successfully formed) were produced in the same manner as in Example 2 except that the concentration of the ethylenedioxythiophene alcohol solution used for the formation of fine protrusions was changed to 20% and the operation of alternately dipping the sintered body in this solution and in an alcohol solution of 18% iron naphthalenesulfonate without further dipping it in alcohol was repeated 30 times, whereby instead of forming fine protrusions, a chemical polymerization layer was formed on the electric conductor having provided thereon a dielectric layer. Incidentally, the chemical polymerization layeredly covered the dielectric layer.

Example 3

Capacitors were produced in the same manner as in Example 1 except for producing the sintered body (sintering temperature: 1,360° C., sintering time: 20 minutes, density of the sintered body: 6.0 g/cm$^3$) by using tantalum powder having a CV value of 70,000 µF·V/g in place of the tantalum powder used in Example 1.

The capacitance, impregnation ratio, ESR value and LC value of each of the capacitors produced above were measured by the following methods. The measurement results (average values) are shown in Table 1.

Capacitance of the Capacitor:

The capacitance was measured at room temperature and 120 Hz by using an LCR measuring meter manufactured by Hewlett Packard, Ltd.

Impregnation Ratio:

This is a percentage of a numerical value obtained by dividing the capacitance of the capacitor by the capacitance of each electric conductor having formed thereon a dielectric layer as measured in 30% sulfuric acid. ESR value:

The equivalent series resistance of the capacitor was measured at room temperature and 100 kHz.

LC Value:

A predetermined rated voltage (2.5 V in Examples 1 and 3 and Comparative Example 1, and 4 V in Example 2 and Comparative Example 2) was continuously applied between the terminals of the produced capacitor at room temperature for 30 seconds and thereafter, the LC value was measured.

TABLE 1

|  |  | Capacitance* (µF) | Impregnation ratio* (%) | ESR* (mΩ) | LC* (µA) |
| --- | --- | --- | --- | --- | --- |
| Examples | 1 | 1071 | 85 | 8 | 33 |
|  | 2 | 459 | 85 | 13 | 29 |
|  | 3 | 509 | 91 | 13 | 6 |
| Comparative | 1 | 945 | 75 | 9 | 39 |
| Examples | 2 | 400 | 74 | 26 | 40 |

*In Examples 1 to 3, an average of 320 capacitors.
In Comparative Example 1, an average of 206 capacitors.
In comparative Example 2, an average of 187 capacitors.

As seen from comparison between Example 1 and Comparative Example 1 and between Example 2 and Comparative Example 2 and also from comparison with Example 3, when fine protrusions are formed on the dielectric layer before energization for the formation of a semiconductor layer, a capacitor exhibiting a good capacitance appearance factor and a low ESR value can be obtained.

INDUSTRIAL APPLICABILITY

The present invention provides a method for producing a capacitor comprising, as one electrode, an electric conductor having formed on the surface thereof a dielectric layer and, as the other electrode, a semiconductor layer formed on the electric conductor by energization using the electric conductor as the anode, wherein fine protrusions are formed on the dielectric layer before energization.

According to the present invention, a good capacitance appearance factor can be achieved and therefore, a capacitor having a high capacitance and a low ESR can be obtained.

The invention claimed is:

1. A method for producing a capacitor comprising, as one electrode, an electric conductor having formed on the surface thereof a dielectric layer and, as a second electrode, a semiconductor layer formed on the electric conductor by energization, which comprises dipping a negative electrode and the electric conductor having formed on the surface thereof the dielectric layer in a semiconductor layer-forming solution, and applying a positive potential to the electric conductor and a negative potential to the negative electrode so as to pass an electric current between the electric conductor and the negative electrode, wherein discrete feather-shaped fine protrusions are present on a part of but less than the entire surface of the dielectric layer prior to any energization having a width of about 0.1 to about 120 nm and a height of about 0.1 to about 600 nm.

2. A method for producing a capacitor comprising, as one electrode, an electric conductor having formed on the surface thereof a dielectric layer and, as a second electrode, a semiconductor layer formed on the electric conductor by energization, which comprises dipping a negative electrode and the electric conductor having formed on the surface thereof the dielectric layer in a semiconductor layer-forming solution, and applying a positive potential to the electric conductor and a negative potential to the negative electrode so as to pass an electric current between the electric conductor and the negative electrode, wherein discrete fine protrusions having a width of 0.1 to 60 nm are present on a part of but less than the entire surface of the dielectric layer prior to any energization, said electric conductor having inner pores formed therein, and wherein a majority of the fine protrusions overlay an outer surface of the dielectric layer or overlay an outer surface of the dielectric layer and an inner pore surface of the electric conductor within 10 μm from the outer surface.

3. The method for producing a capacitor as claimed in claim 1 or 2, wherein the fine protrusion is at least one member selected from a metal oxide, a metal salt, a transition element-containing inorganic compound, a transition element-containing organic compound and a polymer compound.

4. The method for producing a capacitor as claimed in claim 1 or 2, wherein the electric conductor is at least one member selected from a metal, an inorganic semiconductor, an organic semiconductor and carbon or a mixture thereof.

5. The method for producing a capacitor as claimed in claim 1 or 2, wherein the electric conductor is a laminated body having, as the surface layer, at least one member selected from a metal, an inorganic semiconductor, an organic semiconductor and carbon, or a mixture thereof.

6. The method for producing a capacitor as claimed in claim 1 or 2, wherein the dielectric layer mainly comprises at least one member selected from metal oxides such as $Ta_2O_5$, $Al_2O_3$, $TiO_2$ and $Nb_2O_5$.

7. The method for producing a capacitor as claimed in claim 1 or 2, wherein the semiconductor layer is at least one member selected from an organic semiconductor layer and an inorganic semiconductor layer.

8. The method for producing a capacitor as claimed in claim 7, wherein the organic semiconductor is at least one member selected from an organic semiconductor comprising benzopyrroline tetramer and chloranil, an organic semiconductor mainly comprising tetrathiotetracene, an organic semiconductor mainly comprising tetracyano-quinodimethane, and an organic semiconductor mainly comprising an electrically conducting polymer obtained by doping a dopant into a polymer containing a repeating unit represented by the following formula (1) or (2):

(1)

(2)

wherein $R^1$ to $R^4$ each independently represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom, and represents a hydrogen atom or an alkyl group having from 1 to 6 carbon atoms, and each of the pairs of $R^1$ and $R^2$, and $R^3$ and $R^4$ may combine with each other to form a cyclic structure.

9. The method for producing a capacitor as claimed in claim 8, wherein the electrically conducting polymer containing a repeating unit represented by formula (1) is an electrically conducting polymer containing a structure unit represented by the following formula (3) as a repeating unit:

(3)

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen atoms when the alkyl groups are combined with each other at an arbitrary position, and the cyclic structure includes a structure having a vinylene bond which may be substituted, and a phenylene structure which may be substituted.

10. The method for producing a capacitor as claimed in claim 8, wherein the electrically conducting polymer is selected from polyaniline, polyoxyphenylene, polyphenylene sulfide, polythiophene, polyfuran, polypyrrole, polymethylpyrrole, and substitution derivatives and copolymers thereof.

11. The method for producing a capacitor as claimed in claim 9, wherein the electrically conducting polymer is poly (3,4-ethylenedioxythiophene).

12. The method for producing a capacitor as claimed in claim 7, wherein the inorganic semiconductor is at least one compound selected from molybdenum dioxide, tungsten dioxide, lead dioxide and manganese dioxide.

13. The method for producing a capacitor as claimed in claim 7, wherein the electrical conductivity of the semiconductor is from $10^{-2}$ to $10^3$ S/cm.

14. A capacitor produced by the production method claimed in claim 1 or 2.

15. The capacitor as claimed in claim 14, wherein the impregnation ratio of the semiconductor is 85% or more.

16. An electronic circuit using the capacitor claimed in claim 14.

17. An electronic device using the capacitor claimed in claim 14.

18. The method for producing a capacitor as claimed in claim 2, wherein 80% or more of the fine protrusions overlay an outer surface of the dielectric layer or overlay an outer surface of the dielectric layer and an inner pore surface of the electric conductor within 10 μm from the outer surface.

19. The method for producing a capacitor as claimed in claim 1 or 2, wherein the fine protrusion is at least member selected from a metal salt, a transition element-containing inorganic compound and a transition element-containing organic compound.

20. The method for producing a capacitor as claimed in claim 1 or 2, which comprises electrolytically forming the fine protrusions on the dielectric layer.

21. The method for producing a capacitor as claimed in claim 1, wherein the discrete feather-shaped fine protrusions have a width of about 0.1 to about 60 nm and a height of about 0.1 to about 120 nm.

22. The method for producing a capacitor as claimed in claim 2, wherein the discrete fine protrusions have a width of 0.1 to 30 nm.

23. The method for producing a capacitor as claimed in claim 1, wherein said applying step comprises connecting the electric conductor to a positive terminal of a power supply and connecting the negative electrode to a negative terminal of the power supply.

24. The method for producing a capacitor as claimed in claim 2, wherein said applying step comprises connecting the electric conductor to a positive terminal of a power supply and connecting the negative electrode to a negative terminal of the power supply.

* * * * *